(12) United States Patent
Mitchell et al.

(10) Patent No.: US 9,111,124 B2
(45) Date of Patent: Aug. 18, 2015

(54) KEY VERIFICATION OF REPLACEABLE FUEL CARTRIDGES

(71) Applicant: INTELLIGENT ENERGY LIMITED, Loughborough (GB)

(72) Inventors: Philip Mitchell, Loughborough (GB); Anand Chellappa, Long Beach, CA (US); Henri Winand, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 0 days.

(21) Appl. No.: 14/380,680

(22) PCT Filed: Jan. 22, 2013

(86) PCT No.: PCT/US2013/022522
§ 371 (c)(1),
(2) Date: Aug. 22, 2014

(87) PCT Pub. No.: WO2013/112459
PCT Pub. Date: Aug. 1, 2013

(65) Prior Publication Data
US 2015/0021390 A1    Jan. 22, 2015

Related U.S. Application Data

(60) Provisional application No. 61/591,483, filed on Jan. 27, 2012.

(51) Int. Cl.
*G06F 17/00* (2006.01)
*G06K 5/00* (2006.01)
*H01M 8/04* (2006.01)
*G06K 19/06* (2006.01)
*G06K 19/067* (2006.01)

(52) U.S. Cl.
CPC .............. *G06K 5/00* (2013.01); *G06K 19/067* (2013.01); *G06K 19/06037* (2013.01); *H01M 8/04201* (2013.01); *H01M 8/04208* (2013.01); *Y02E 60/50* (2013.01)

(58) Field of Classification Search
CPC ... B67D 7/348; G06Q 50/06; H01M 8/04208; H01M 2250/30; H01M 8/04201; H01M 8/04298; H01M 8/22; Y02E 60/50; F17C 2221/012; F17C 2270/0763; Y02B 90/18
USPC ............................................. 235/375, 462.01
See application file for complete search history.

(56) References Cited

U.S. PATENT DOCUMENTS 5,355,701 A    10/1994    Tobias
6,616,036 B2    9/2003    Streicher et al.
(Continued)

FOREIGN PATENT DOCUMENTS

EP    2399636    12/2011

OTHER PUBLICATIONS

International Search Report dated May 15, 2013, issued in International Patent Application PCT/US2013/022522.

*Primary Examiner* — Tuyen K Vo
(74) *Attorney, Agent, or Firm* — Baker & Hostetler LLP

(57) ABSTRACT

Verifying authenticity of a hydrogen fuel canister by utilizing at least one unique identifier element (UIE) associated with a fuel canister; inputting the UIE into a communication device; querying a database with said communication device to determine a value for the UIE; placing a hole matrix on a canister into a matrix interface reader; measuring a value associated with the position of one or more movable fixtures in the matrix interface reader; comparing the value obtain via the matrix interface reader with the value associated with the UIE and, using the comparison to authenticate or not authenticate if the hydrogen in said canister may be used, is disclosed.

17 Claims, 6 Drawing Sheets

(56) References Cited

U.S. PATENT DOCUMENTS

| | | | |
|---|---|---|---|
| 7,674,536 B2 * | 3/2010 | Chipchase et al. | 429/515 |
| 7,820,313 B2 | 10/2010 | Winkler | |
| 2008/0115212 A1 * | 5/2008 | Arias et al. | 726/21 |
| 2008/0157918 A1 * | 7/2008 | Black et al. | 340/5.8 |
| 2010/0273069 A1 * | 10/2010 | Crumm et al. | 429/410 |

* cited by examiner

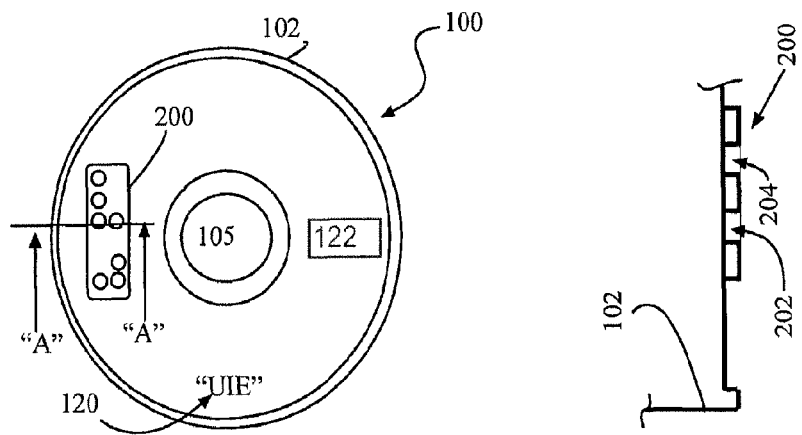
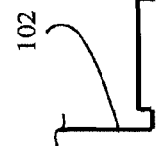
Fig. 1A
Fig. 1B
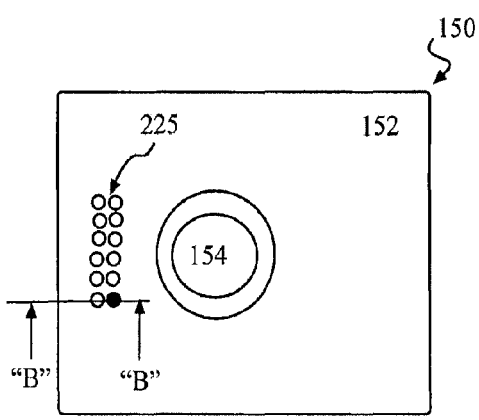
Fig. 2A
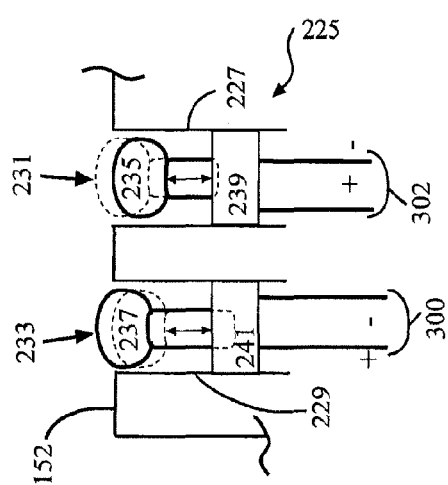
Fig. 2B
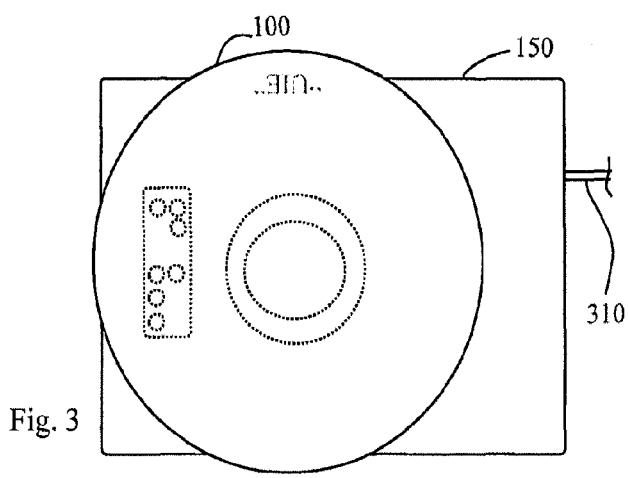
Fig. 3

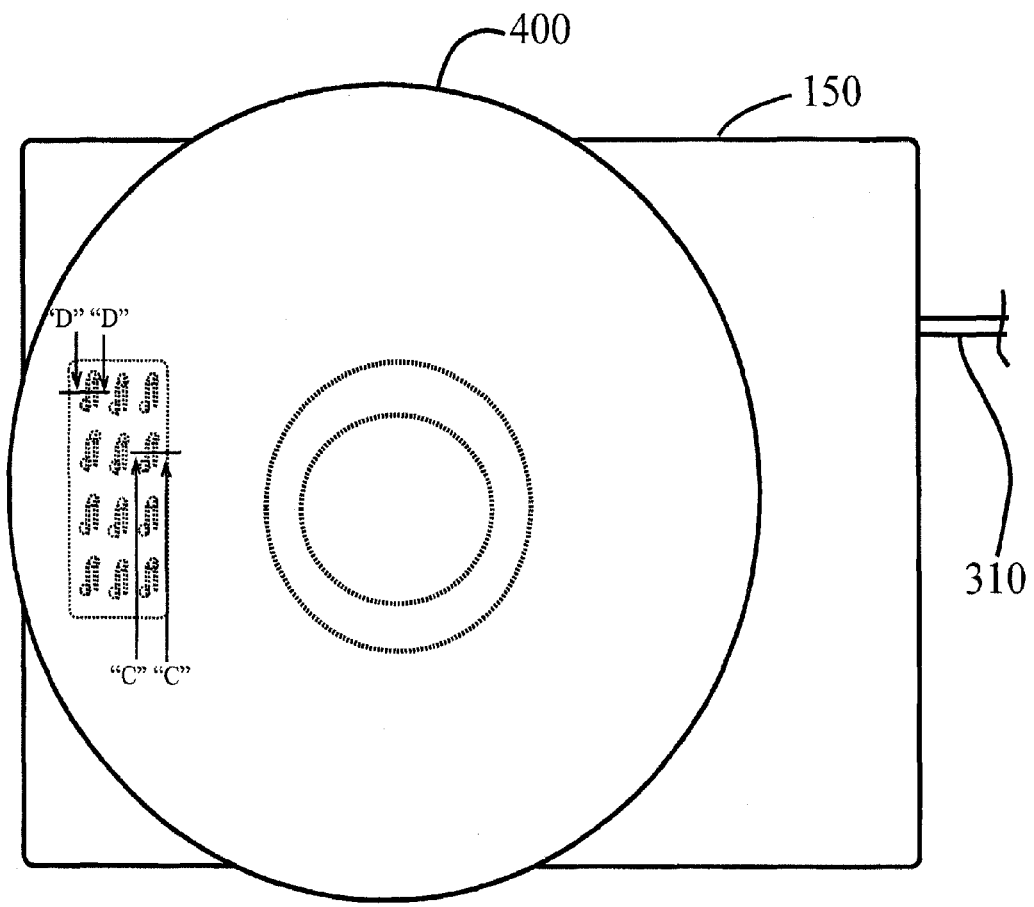
Fig. 6A
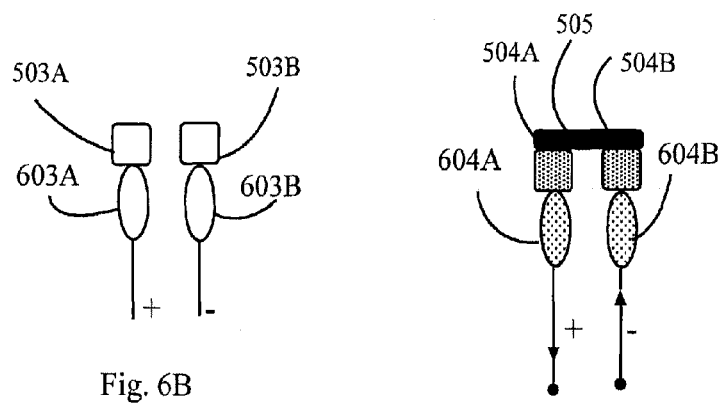
Fig. 6B
Fig. 6C

KEY VERIFICATION OF REPLACEABLE FUEL CARTRIDGES

RELATED APPLICATION

The present application is a U.S. National Stage of International Application No. PCT/US2013/022522, filed Jan. 22, 2013, which claims the benefit of and priority to U.S. Provisional Application No. 61/591,483, filed Jan. 27, 2012, the entire disclosures of each of which are incorporated herein by reference in their entireties.

BACKGROUND

1. Field

This disclosure relates to fuel cell power systems, fuel cartridges to support such systems, and methods for supplying and authenticating fuel cartridges for use in fuel cell powered systems.

2. General Background

World-wide commercial use of fuel cell powered host devices, particularly portable devices. A non-exclusive list of potential host devices include, but are not limited to, computer peripherals, mobile phone peripherals, mobile phones, personal music players, laptops, notebooks, tablet, gaming devices, personal digital assistants (PDAs), and battery chargers. A fuel cell power system can either be located inside the host device or can be connected to the host device using suitable means. In either case, a means to provide fuel to the power system is required. An example of one such means is the use of fuels packaged in cartridges (packaged fuel) in predetermined amounts to satisfy the volume, weight and run time requirements of the host device, use profile of the host device, and regulatory requirements associated with the host device. For the sake of simplicity, a fuel cell power system is considered to comprise of a fuel cell subsystem that includes the fuel cell or a multiplicity of fuel cells in the form of a fuel cell stack, fluid, and power management means, a process controller, and the fuel cartridge. The fuel cartridge is connected to the fuel cell subsystem system using a connector or coupling.

To support commercialization, low-cost, user-friendly, methods for authentication, and methods for monitoring the status and health of the fuel cell power system, and logistics associated with supply and disposing of fuel cartridges are needed. At the other end of the spectrum of low-cost are cartridges such as those disclosed in U.S. Pat. Nos. 7,655,331, 7,401,712, 7,306,863, 6,828,049 and 7,914,945. Such cartridges require memory components and other identification tags to enable this bi-directional communication. One may expect higher unit costs for such devices, and part of the costs in recycling of spent cartridges may include expensive components to be harvested.

Accordingly, it is a desideratum to have an alternative to "smart" cartridges to enable user-friendly and low-cost fuel cartridges and fuel cell power systems, and methods that enable authentication of fuel cartridges for use in fuel cell power systems.

DESCRIPTION

According to some exemplary implementations, a method, system and device for authenticating replaceable hydrogen cartridges in a host system utilizing at least a fuel cell to generate electricity.

According to some exemplary implementations, a method, system and device for using key and/or Ving® lock assemblies to mechanically authenticate replaceable hydrogen cartridges in a host system utilizing at least a fuel cell to generate electricity.

According to some exemplary implementations, a method, system and device for using key and/or Ving® lock assemblies to electrically and mechanically authenticate replaceable hydrogen cartridges in a host system utilizing at least a fuel cell to generate electricity.

According to some exemplary implementations, a method, system and device for utilizing a unique identifier element (UIE) to authenticate a replaceable hydrogen canister's authenticity for use in a host system, the UIE encoding for a predetermined value that corresponds to the positions of a series of moving elements which correspond to mechanical tumblers as set forth in U.S. Pat. No. 5,355,701 which is hereby incorporated by this reference as if fully set forth herein and as set forth in U.S. Pat. No. 4,488,036, which is hereby incorporated by this reference as if fully set forth herein. A key affixed to or formed as part of a hydrogen canister physically restricts the positions of the aforementioned series of movable elements to the specified value; and a UIE associated on the canister whereby a database or LUT is accessed by a processors to obtain value corresponding to the correct positions said movable elements should be in, if the canister associated with the UIE is authentic.

According to some exemplary implementations, a method of verifying, for use, a hydrogen fuel canister, by connecting at least one unique identifier element (UIE) associated with a fuel canister on the fuel canister to a database; inputting the UIE into a communication device; query a database with said communication device to determine a value for the UIE; placing a hole matrix on a canister into a matrix interface reader; measuring a value associated with the position of one or more movable fixtures in the matrix interface reader; comparing the value obtain via the matrix interface reader with the value associated with the UIE; and, using the comparison to authenticate or not authenticate if the hydrogen in said canister may be used.

In some instances, the movable fixtures are each connected to a contact plate which each forms an on-off switch depending on the position of each movable fixture.

In some instances, each contact plate has a pair of electrical leads whereby the condition of the contact plate being on or off can be measured.

According to some exemplary implementations, a method of verifying, for use of a hydrogen fuel canister, the method including obtaining a value for a unique identifier element (UIE) associated with a fuel canister by querying a database; placing an electronic matrix on a canister into a e-matrix reader; measuring a value for the electronic matrix via the e-matrix reader of the on or off state of one or more array elements in said electronic matrix; comparing the value obtain via the e-matrix reader with the value from the database associated with the UIE; and, using the comparison to authenticate or not authenticate the canister.

In some instances the on state corresponds to a first and second contact being conductively connected. In some instances each the e-matrix reader is comprised of tab pairs corresponding to each array member. In some instances, each tab comprises two nodes, with each node corresponding to a first and a second contact in each array member.

In some instances a communication device within a host device queries the database. In some instances, a communication device remote from a host device queries the database.

DRAWINGS

FIG. 1A is an exterior view of a hydrogen canister and dispensing end.

FIG. 1B is a view along the line of A-A in FIG. 1A;

FIG. 2A is an exterior view of a host and a fuel receiving end;

FIG. 2B is a view along the line of B-B in FIG. 2A;

FIG. 3 is a mounted view of a hydrogen canister in said host device;

FIG. 6A is a mounted view of a hydrogen canister in said host device;

FIG. 6B is a component view of an open switch;

FIG. 6C is a component view of a closed switch;

Figure 4A:
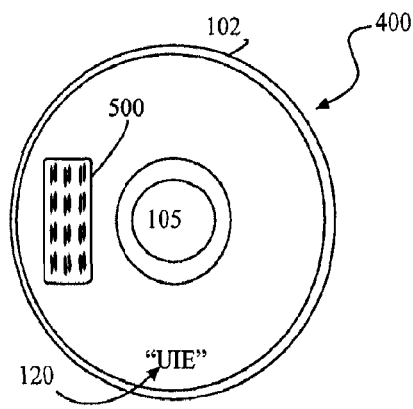
FIG. 4A is an exterior view of a hydrogen canister and dispensing end.

All callouts in the attached figures are hereby incorporated by this reference as if fully set forth herein.

It should be appreciated that, for simplicity and clarity of illustration, elements shown in the figures have not necessarily been drawn to scale. For example, the dimensions of some of the elements are exaggerated, relative to each other, for clarity. Further, where considered appropriate, reference numerals have been repeated among the Figures to indicate corresponding elements. While the specification concludes with claims defining the features of the present disclosure that are regarded as novel, it is believed that the present disclosure's teachings will be better understood from a consideration of the following description in conjunction with the figures and appendix in which like reference numerals are carried forward.

FURTHER DESCRIPTION

PEM fuel cells require hydrogen fuel to generate electricity. Hydrogen can be stored as-is or can be produced on demand. In certain applications, it is useful to have replaceable hydrogen supplies which may be supplied as pressurized gas in tanks (also known as a container, outer shell, tank, canister or cartridge) or hydrogen stored in metal hydrides, in slurries or in other substrates. Hydrogen may also be supplied in the form of a precursor chemical in the form of a chemical hydride. The latter is particularly suited for portable power system whereby the chemical stored in the tank is reacted using suitable methods, as needed, to produce hydrogen on-demand.

High purity hydrogen is preferred when used in a PEM fuel cell. Purity above 99% is preferred. Hydrogen above about 99.9% purity is more preferred and hydrogen above about 99.99% purity is most preferred. Assuring proper purity of hydrogen is important as impurities in a hydrogen fuel supply may damage or degrade the performance of the PEM fuel cell. Deterring the use of an unauthorized or unauthenticated hydrogen fuel source is one means of insuring that the end user can rely on the stable and production of power from a PEM fuel cell system. This also enables monitoring and disposal of counterfeit hydrogen supplies.

A card lock of which a Vingcard® is a brand of, including those generally disclosed in U.S. Pat. Nos. 5,355,701 and 4,488,036, teach the use of a card key with a slot loading reader for unlocking doors.

In some exemplary implementations, at least one of a method, system and device to authenticate a hydrogen cartridge is disclosed. In FIGS. 1A and 1B, a hydrogen cartridge 100 having a hollow body 102 which is impermeable to leakage of hydrogen beyond a de minimis level, at preselected pressure and under predetermined conditions, is disclosed. Said body 102 may be lined or unlined. Said tank provides at least one dispensing end 105 having with a fluid communication means such as a valve, or membrane, frangible barrier, and/or the like.

To protect the costly investment of the fuel cell power system or subsystem it is desirable that the supply of hydrogen provided to such a fuel cell system is verified as being pure. Utilizing sensors or gaseous quality monitoring is not always feasible or economically feasible. In lieu of sampling the quality of hydrogen provided in a tank another option is to authenticate the tank and its content via a unique identifier element 120 (UIE) which encodes for an authentication setting. As used herein an authentication setting refers to one or more selection of criteria to be measured via a controller with processors in a host device.

FIGS. 1A and 1B show a cut-away view of a hole matrix 200 affixed to or formed as part of the body 102. The hole matrix provides one or more cavities, in this instance shown as a first cavity 202 and a second cavity 204, whereby a movable fixture can reversibly mate therewith. A serial number (S/N) 122 or other identifier of an individual cartridge can be connected to a cartridge and may be used as a database entry to compare values associated with cartridge authentication to a specific cartridge.

FIG. 2A is an exterior view of a host device 150 which mates with a cartridge 100. The host device may be a carriage connected to a larger device or a device containing at least a fuel cell stack. The host provides an enclosure 152 which may contain the fuel cell stack, controllers, fuel flow channels or other fluid pathways, and balance of plant for a fuel cell stack, as well as any other electronic or mechanical components said host utilizes or enables with production of electricity from hydrogen. A fuel receiving means 154 is provided thereon. The enclosure 152 also supports and houses a matrix interface 225.

FIG. 2A shows a cut-away view of the matrix interface 225. The interface matrix being a reader that provides a series of guides which correspond to the potential matrix cavities of said hole matrix. The matrix forms a grid or arrangement and each member of the array is shown having a specific and identifiable location in the grid or arrangement. Guides 227 and 229 provide a pathway for movable fixtures 231 and 233. Each movable fixture has a head 235 and 237 of a size and shape to fit into a matrix cavity such as those illustrated in FIG. 1B. The heads are each moveably connected to a contact plate 239 and 241, whereby the position of the head in a cavity generates a value and the position of a head not in a cavity generates a value. Extending from each contact plate 239 and 241 are electrical leads 300 and 302. Those of ordinary skill in the art will recognize that it is within the scope of this disclosure that said contacts plate may be alternatively be pressure switches such as metal thin-film pressure sensor, piezo-resistive pressure sensor, ceramic thick-film pressure sensor and pressure transducers. Such sensors and transducers which can report variable pressure (which corresponds to the depth the head is at in the guide) whereby the pressure sensor changes the physical variable "pressure" into a quantity that can be processed electrically and reported to the host processor(s).

In some instances, each contact acts as an on-off switch and a value for the whole matrix may be obtained by summing the on switches versus the total switches or summing the off switches versus the total. The sums are then compared to a target value associated with said UIE.

In some instances, the controller of the host device maintains a record of the physical location of each contact in the matrix. Accordingly, in addition to, or in lieu of, determining a sum value of contact switches on-off, it is possible to determine the spatial position of on, off or on and off switches, and to compare that positional map to such a map encoded by said UIE and obtained via a LUT or database. The sums are then compared to a target value associated with said UIE.

The role of UIE 120 in authentication can be multifold, in the case of the hole matrix arrangement the holes may be used to limit fit of a cartridge for mating to a cartridge with the proper array of holes. Further, for authentication the precise hole is to provide a target value which the host by way of processors compares to a value derived from reading the cartridge matrix to determine if said cartridge matches the target value. If a cartridge matches a target value, the cartridge may then be authenticated and that authentication is at least one criterion to validate the hydrogen in the cartridge for use.

The target value a particular UIE encodes for may be derived from a look up table (LUT) or database within a memory physically in the host device. The target value for may be derived from a LUT or database remote from said host device. The UIE, in either case is connected to a value. Remote locations may be a smart device such as a cellphone, tablet, computer and the like. Other remote storage location's may be on the internet and/or in servers or simply in a flash memory, thumb or jump drive (or other small host powered (i.e. USB or other bus device) which can be plugged into an I/O of the host device.

FIG. 3 shows an assembled view of a cartridge 100 mated to a host device 150. In those instances wherein the host device at least functions as a power supply for remote electrical utilizing devices a power connection 310 which receives power from the fuel cell stack being powered via the hydrogen fuel from an authenticated cartridge is shown.

FIG. 4 illustrates a hydrogen cartridge 400 having a hollow body 102 which is impermeable to leakage of hydrogen beyond a de minimis level, at preselected pressure and under predetermined conditions, is disclosed. Said body 102 may be lined or unlined. Said tank provides at least one dispensing end 105 having with a fluid communication means such as a valve, or membrane, frangible barrier and the like. A unique identifier element 120 (UIE) which encodes for an authentication setting is fixed, formed or placed thereon and a matrix 500.

Figures 4B, 4C:
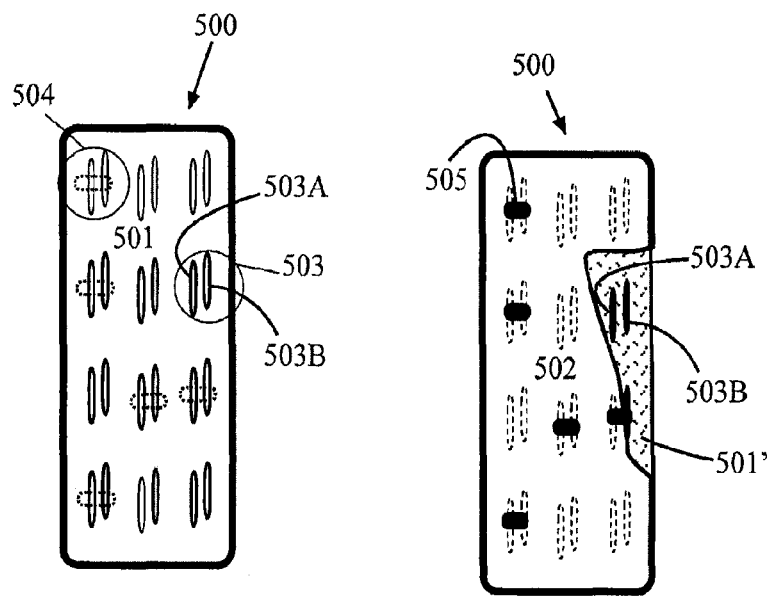
FIGS. 4B-4C are enlarged views of an authentication element of FIG. 4A.

FIGS. 4B and 4C shows the two faces of a generally planar electronic matrix 500. The exterior face 501 of the electronic matrix 500 is exposed. The interior face 502 is against the body 102. The electronic matrix may also be formed as a layered substrate.

Figure 5:
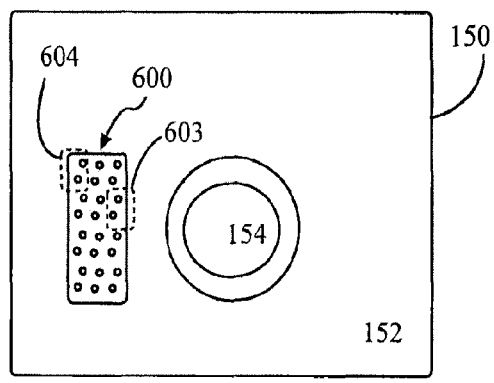
FIG. 5 is an exterior view of a host and a fuel receiving end.

The inner side 502 of the electronic matrix is formed of array elements, also shown is a partially exploded view of the interior of the electronic matrix 501. The view is from the inner side (nearest the body surface) towards the exterior side. A first array element 503 is comprised of at least a first contact 503A and a second contact 503B. Said first and second contacts being visible on the exterior of said cartridge (see FIG. 4A). Illustrated in FIG. 4C is the interior side 502 of the electronic matrix 500 with a portion of the exterior side removed to show an interior view 501 wherein at the internal surface of the first array element 504, the first and second contacts 503A and 503B are visible. Also visible form the interior side 502 is a conductive connector contact 505 whereby it forms a conductive link between a second array element 504, the first contact 504A and the second contact 504B being conductively connected FIG. 5 is an exterior view of a host device 150 which mates with a cartridge 400. The host device may be a carriage connected to a larger device or a device containing at least a fuel cell stack. The host provides an enclosure 152 which may contain the fuel cell stack, controllers, fuel flow channels or other fluid pathways and balance of plant for a fuel cell stack as well as any other electronic or mechanical components said host utilizes or enables with production of electricity from hydrogen. A fuel receiving means 154, to accept and mate with the fuel dispensing end 105 is provided thereon. The enclosure 152 also supports and houses an e-matrix reader 600. The e-matrix reader has pairs of conductive tabs forming an array. A first tab pair is formed in the third column second row of the e-matrix and designated 603. A second tab pair is formed in the upper left corner designated 604.

FIGS. 6B and 6C show cut-away views from FIG. 6A. FIG. 6B is a cutaway taken at line D-D and FIG. 6C is a cutaway taken at line C-C.

Line C-C crosses the region of the first tab pair formed in the third column second row of the e-matrix and designated 603. Herein the first array element 503 has a first contact 504A and a second contact 504B. The first contact 504A is in contact with first node 603A of tab 603 and second contact 503B is in contact with second node 603B of tab 603. No contact is made between the first and second contact, therefore if electrical power was supplied to the first or second contact no power would pass from the lead wire attached to the first node 603A to the second node 603B.

Line D-D crosses the region of the second tab pair in the upper left corner of the electronic matrix 500 designated 604. Said second tab pair is in contact with the second array element 504. The second array element having a first contact 504A and a second contact 504B. The first contact 504A is in contact with first node 604A of tab 604 and second contact 504B is in contact with second node 604B of tab 604. A connector contact 505 is conductively connected to the first contact 504A and the second contact 504B accordingly when powered electrical power will pass from the lead wire attached to the first node 604A to the second node 604B.

Figure 7A:
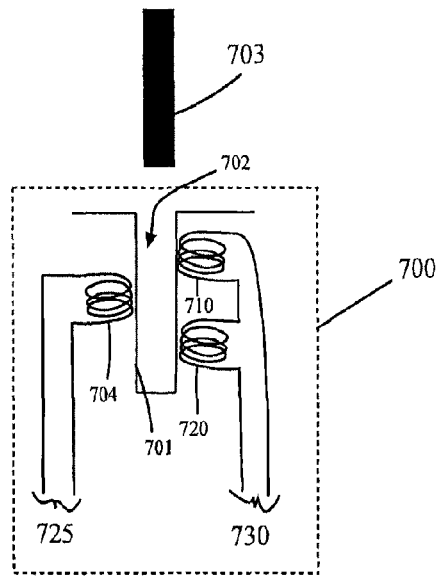
FIG. 7A is a view of Linear Variable Differential Transformer (LVDT) measurement component of an authentication system.
Figure 7B:
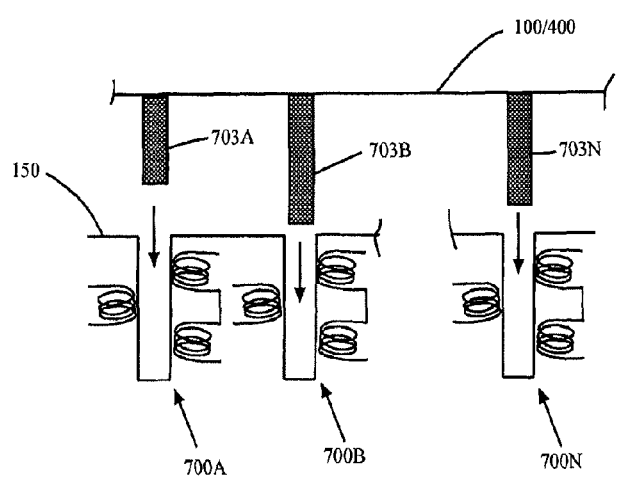
FIG. 7B is a first component view of an LVDT authentication system.
Figure 7C:
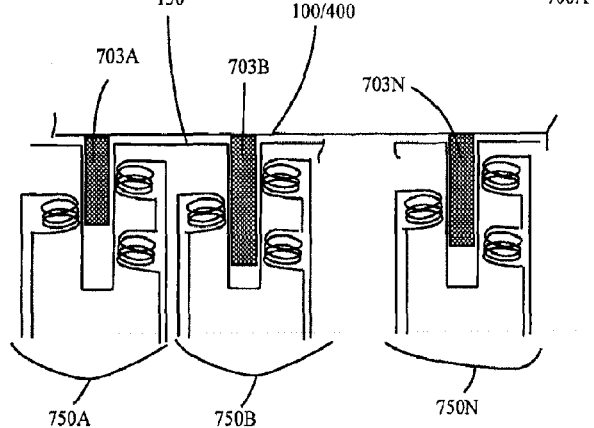
FIG. 7C is a second view of the LVDT authentication system of FIG. 7B.

FIGS. 7A through 7C utilize an armature matrix 700 whereby a Linear Variable Differential Transformer (LVDT) element, having a reception 701 provides a guide 702 in a host 150 for an armature 703 associated with a fuel canister 100/400. The LVDT measures the position of the armature relative to windings wherein values may be obtained. The position of the armatures the armature matrix is within the disclosure. Additionally, a sum total of multiple winding values may be independent of spatial location in some instance the grid position of the armatures or guides may be ignored.

The guide is in close proximity to a primary coil 704 and a secondary coil 705 having a first ½ secondary winding 710 and a second ½ secondary winding 720. The LVDT is a variable-reluctance device, where the primary coil 704 establishes a magnetic flux that is coupled through the armature (which in this disclosure is formed as part of, support on, or affixed to the hydrogen fuel tank 100/400). The transfer of current supplied by the host or via a battery between the primary coil 704 and the secondaries 705 is measurable. With LVDTs, the phase of the output (compared with the excitation phase) enables the electronics to measure a position of where the armature is in relationship to the two ½ secondaries and said position can be used to measure a value of one or more armatures and compare said value to a reference value associated with a UIE. FIGS. 7B and 7C show armatures 703A-703N which form an array of armatures in reference to the armature matrix 700A-700N. Because the first armature 703A and the second armature 703B and the next armature 703N are of different lengths the induction will vary per insertion, further by measuring each one of the values for each position of each armature and coils a first value 750A, a second value 750B and a next value 750N can be measured and a set of value points can be provided to said host's processor whereby the values or sum of the value are compared to a target value associated with a serial number or other identifier that specifies the cartridge identity. The target value, as previously discussed may reside in a local or remote database or LUT that is accessible either to the host via a communication device in the host, or via a communication device which is separate from the host.

The symmetrically-wound secondary coil 710/720 on either side of the primary. Current is supplied the primary via leads 725. When the armature 703 is inserted between the two series-opposed secondaries, magnetic flux couples into both secondaries and the voltage induced in each half of the secondary windings are measurable from leads extending therefrom 730.

Alternatively those of ordinary skill in the art will recognize that another transducer system known as "Magnetostrictive" may be used in lieu of a LVDT to use the positioning of a magnetic portion of a pin or other element (which also may be placed in an array of more than one such elements) with respect to a sensor. See generally http://www.rdpe.com/ex/hiw-magneto.htm, which is incorporated by this reference. A transducer comprises a sensor element a signal converter and a position magnet. Said position magnet may be selectively placed on one or more armatures, pins or element affixed to the hydrogen fuel tank and mated with one or more sensors on said host to provide an electrical pulse to interact with the magnet and provide a measureable mechanical pulse which provides a measurement of magnet position. Said measurement being a value which may be used as part of a larger value or separately by itself to determine a cartridge's value. The cartridge value, as previously disclosed can be used to authenticate the cartridge via a UIE, a LUT or other corroboration o that value.

Figure 8A:
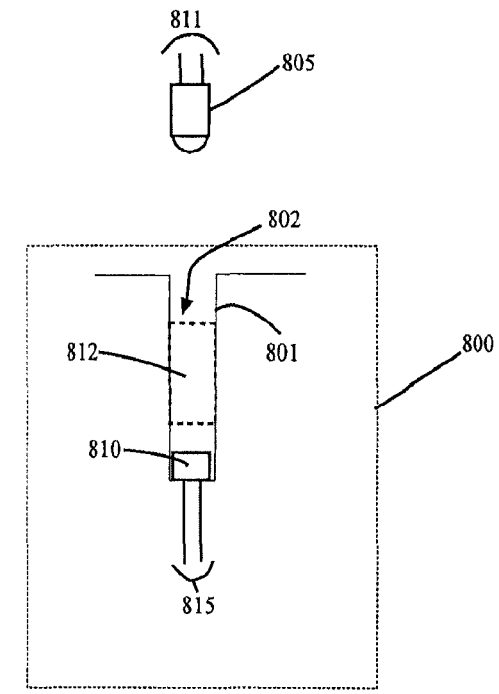
FIG. 8A is a view of illumination measurement component of an authentication system; and, FIG. 8B is a component view of an illumination authentication system; and, FIG. 9 is a partial schematic of major components of a system utilizing replaceable hydrogen cartridges to supply a fuel cell and provide electrical power.
Figure 8B:
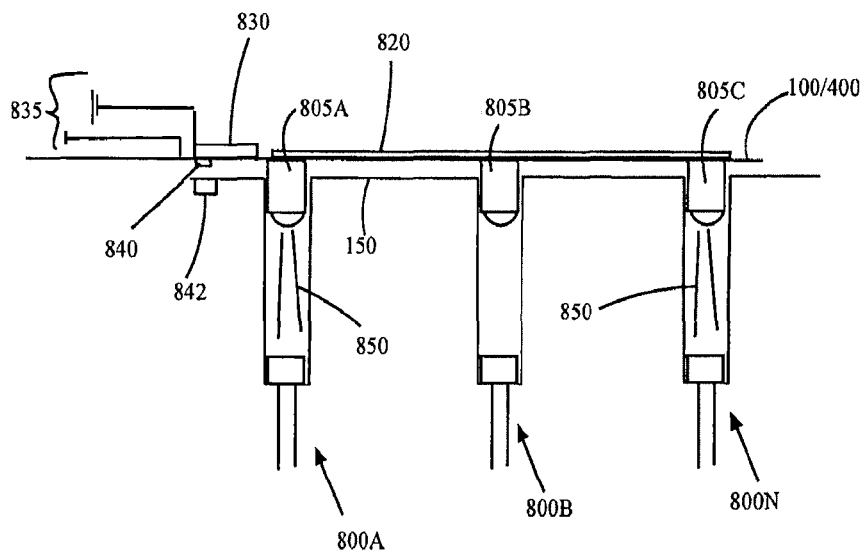

FIGS. 8A and 8B show a photon measurement matrix component 800 of an authentication system wherein a reception 801 provides a guide 802 for an illumination source 805. A detector 810 may be positioned in the reception to receive and detect photons at a prescribed wavelength or range of wavelengths and/or simply to detect the presence or absence of photons at a specified level. The illumination source 805 has power contacts 811 which are connected to a power supply to provide photons.

The reception is not required. A narrowly focused illumination emitter may be oriented to align with a detector and thereby eliminate or reduce the need for individual wells or receptions. Illumination sources may include lasers, light emitting diodes, electroluminescent materials, light bulbs, fiber optics, reflectors and the like. Additionally, optionally lens or clear cover 812 may be added to the device to modulate the illumination and/or reduce the entry of dust and dirt. Said illumination source has contacts 814 to receive power. Said detector provides contacts 815 to communicate with processors in said host.

FIG. 8B shows illumination sources 805A-805N which form an array of illumination sources in reference to an array of photon measurement component element 800A-800N. Illumination sources 805A-805N are shown supported on a hydrogen tank 100/400. In some instances, an external drive circuit 830 may be connected between said power and said illumination source. In other instances, depending on the illumination source, a power supply may power preselected illumination sources directly. Said drive circuit being connectable 835 to a power supply. Further a conductive connection 840 may be used to switch on the illumination source when said hydrogen fuel tank is connected to said host.

When powered, said illumination sources (which are turned on) produce photons 850. The color of the light (wavelength) the pulse of emissions, the sequence and/or frequency of turning said illumination sources on-off are examples of methods of authenticating a tank via a value derived from the aspects of the illumination sources as measured by the detectors.

Naturally, said illumination sources and said detectors may be reversed with said detectors placed on or associated with said hydrogen fuel tank, and via an electrical connection reporting from said tank to the host processor.

Figure 9:
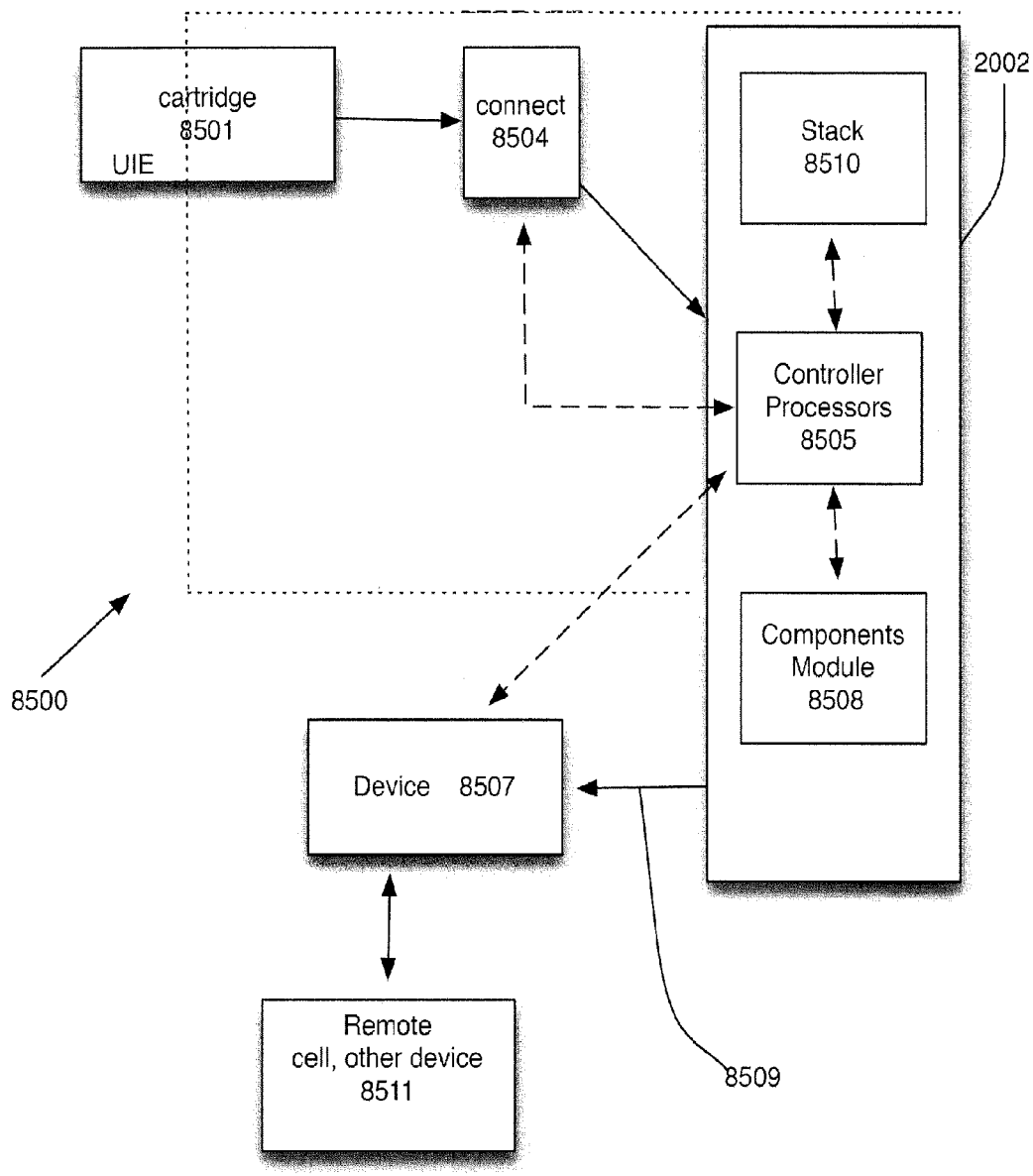

FIG. 9 shows an overview of some major components of a schematic of a system 8500 utilizing replaceable hydrogen fuel supply canisters 8501 with a host 8502. A canister 8501 having a cartridge filled with hydrogen and having a pressure relief valve is connected via a fluid communication means to a gas delivery 8504 component also known as a host fluid communication means. A controller 8505 can be used to control the flow of hydrogen from the canister to the host via the host fluid communication means. Said controller may also be used to communicate with any attached electronic device 8507 utilizing power from said system. Said controller may also interact with processor and logic in the electronics module 8508 regarding optimizing parameters of the system. Electricity is supplied 8509 to the device. Wherein at least one of said controller and electronics adjust the consumption of hydrogen at the fuel cell 8510. A remote communications device such as a cell phone or smart tablet or the like 8511 can interact with the device 8507 and/or the host. The communication device 8511 is a smart device with network access whereby it can query databases, obtain and provide credentials and be used to communicate with remote websites and to authenticate a user.

While the method and devices have been described in terms of what are presently considered to be the most practical, it is to be understood that the disclosure need not be limited to the disclosed implementations. It is intended to cover various modifications and similar arrangements included within the spirit and scope of the claims, the scope of which should be accorded the broadest interpretation so as to encompass all such modifications and similar structures. The present disclosure also includes any and all implementations of the following claims.

It should also be understood that a variety of changes may be made without departing from the essence of the disclosure. Such changes are also implicitly included in the description. They still fall within the scope of this disclosure. It should be understood that this disclosure is intended to yield a patent covering numerous aspects of the invention both independently and as an overall system and in both method and apparatus modes.

Further, each of the various elements of the disclosure and claims may also be achieved in a variety of manners. This disclosure should be understood to encompass each such variation, be it a variation of an implementation of any apparatus implementations, a method or process implementations, or even merely a variation of any element of these.

Particularly, it should be understood that as the disclosure relates to elements of the invention, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this invention is entitled.

It should be understood that all actions may be expressed as a means for taking that action or as an element which causes that action.

Similarly, each physical element, disclosed, should be understood to encompass a disclosure of the action which that physical element facilitates.

Any patents, publications, or other references, mentioned in this application, for patent, are hereby incorporated by reference. In addition, as to each term used, it should be understood that, unless its utilization in this application is inconsistent with such interpretation, common dictionary definitions should be understood, as incorporated, for each term, and all definitions, alternative terms, and synonyms such as contained in at least one of a standard technical dictionary recognized by artisans and the Random House Webster's Unabridged Dictionary, latest edition, are hereby incorporated by reference.

Finally, all references, listed in the Information Disclosure Statement or other information statement filed with the application, are hereby appended and hereby incorporated by reference; however, as to each of the above, to the extent that such information or statements incorporated by reference might be considered inconsistent with the patenting of this/these invention(s), such statements are expressly not to be considered as made by the applicant(s).

In this regard, it should be understood that, for practical reasons, and so as to avoid adding potentially hundreds of claims, the applicant has presented claims with initial dependencies only.

Support should be understood to exist, to the degree required under new matter laws,—including but not limited to United States Patent Law 35 USC 132 or other such laws,—to permit the addition of any of the various dependencies or other elements presented under one independent claim or concept as dependencies or elements under any other independent claim or concept.

To the extent that insubstantial substitutes are made, to the extent that the applicant did not in fact draft any claim so as to literally encompass any particular exemplary implementations, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative exemplary implementations.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps.

Such terms should be interpreted in their most expansive forms so as to afford the applicant the broadest coverage legally permissible.

We claim:

1. A method of verifying, for use, a hydrogen fuel canister, the method comprising:
   connecting at least one unique identifier element (UIE) (120) associated with a fuel canister (102) to a database;
   inputting the UIE into a communication device (8511);
   querying a database with said communication device to determine a target value for the UIE;
   placing a whole matrix (200) on a fuel canister into a matrix interface reader (225);
   measuring a value associated with the position of one or more movable fixtures (2331231) in the matrix interface reader;
   comparing the value obtain via the matrix interface reader with the value associated with the UIE; and,
   using the comparison to authenticate or not authenticate if the hydrogen in said canister may be used.

2. The method of claim 1, wherein the movable fixtures are each connected to a contact plate which each forms an on-off switch depending on the position of each movable fixture.

3. The method of claim 2, wherein each contact plate has a pair of electrical leads whereby the condition of the contact plate being on or off can be measured.

4. The method of claim 1, wherein the movable fixtures are each connected to a pressure sensor contact plate which each forms a variable output switch depending on the position of each movable fixture.

5. The method of claim 3, wherein the identification of the members that are at least one of on and off in the matrix is compared with target value obtained from a look up table or database to determine if a cartridge is authentic.

6. The method of claim 1, wherein the communication device within a host device queries the database.

7. The method of claim 1, wherein the communication device remote from a host device queries the database.

8. A method of verifying, for use, a hydrogen fuel canister, the method comprising:
   obtaining a value for a unique identifier element (UIE) associated with a fuel canister by querying a database;
   placing an electronic matrix (500) on a canister into a e-matrix reader (600);
   measuring a value for the electronic matrix via thee-matrix reader of the on or off state of one or more array elements in said electronic matrix;
   comparing the value obtain via the e-matrix reader with the value from the database associated with the UIE; and,
   using the comparison to authenticate or not authenticate the canister.

9. The method of claim 8, wherein the on state corresponds to a first contact (504A) and second contact (504B) being conductively connected.

10. The method of claim 8, wherein each the e-matrix reader is comprised of tab pairs (604) corresponding to each array member.

11. The method of claim 9, wherein each tab comprises two nodes (604A/604B) and each node corresponding to the first and a second contact in each array member.

12. The method of claim 8, wherein a communication device within a host device queries the database.

13. A method of verifying, for use, a hydrogen fuel canister, the method comprising:
   connecting a cartridge with a host device obtaining a value for a unique identifier element (UIE) associated with a fuel canister by querying a database;

placing a plurality of armatures (703A-703N) on a fuel canister into an armature matrix (700) on a host device;

measuring a value for an induced voltage;

comparing the value measured with the value obtained from the database associated with the UIE; and, using the comparison to authenticate or not authenticate the fuel canister.

14. The method of claim 13, wherein the induced voltage (750) from the plurality of armatures is combined to compare to a target value.

15. The method of claim 13, wherein the induced voltage from each armature is used to compare target induced voltages at specific values (750A-750N) at grid locations in the armature matrix to compare to a target value.

16. A method of verifying, for use, a hydrogen fuel canister, the method comprising:

connecting a cartridge with a host device obtaining a value for a unique identifier element (UIE) associated with a fuel canister by querying a database;

placing a plurality of illumination sources (805A-N) on a fuel canister into guides (802) of a photon measurement matrix (800) on a host device;

measuring illumination values via detectors (810);

comparing the value measured with the value obtained from the database associated with the UIE; and, using the comparison to authenticate or not authenticate the fuel canister.

17. The method of claim 16, wherein the host provides drive circuit current (835) to power the drive circuit (830) for the illumination sources.

* * * * *